United States Patent [19]

Curran

[11] Patent Number: 4,825,652
[45] Date of Patent: May 2, 1989

[54] SMOKE REDUCTION SYSTEM

[75] Inventor: Bernard J. Curran, Irvington, N.Y.

[73] Assignee: Filterpure Corporation, Irvington, N.Y.

[21] Appl. No.: 944,840

[22] Filed: Dec. 19, 1986

[51] Int. Cl.[4] .................................................. F01N 3/02
[52] U.S. Cl. ........................................ 60/309; 55/445;
55/446; 60/311; 60/324; 181/264
[58] Field of Search ............... 60/272, 324, 309, 310,
60/311; 55/445, 446; 181/264, 255, 272

[56] References Cited

U.S. PATENT DOCUMENTS

| 175,890 | 4/1876 | Willson | 55/445 |
| 512,681 | 1/1894 | Clute | 55/446 |
| 3,130,541 | 4/1964 | Babbit | 60/310 |
| 3,618,314 | 11/1971 | Krebs | 60/310 |
| 3,738,089 | 6/1973 | Brill | 60/311 |

FOREIGN PATENT DOCUMENTS

| 2620616 | 3/1977 | Fed. Rep. of Germany | 60/324 |
| 84341 | 3/1920 | Switzerland | 181/264 |
| 268085 | 3/1927 | United Kingdom | 181/270 |

Primary Examiner—Douglas Hart
Attorney, Agent, or Firm—Felfe & Lynch

[57] ABSTRACT

Disclosed is an apparatus for use in nautical craft exhaust systems for removal of smoke and gaseous pollutants from exhaust gases generated therein. The apparatus is formed of an elongate section housing a plurality of double ear arcuate baffles which are individually offset at varying angles from a perpendicular to the longitudinal axis of the elongate section.

18 Claims, 1 Drawing Sheet

U.S. Patent  May 2, 1989  4,825,652
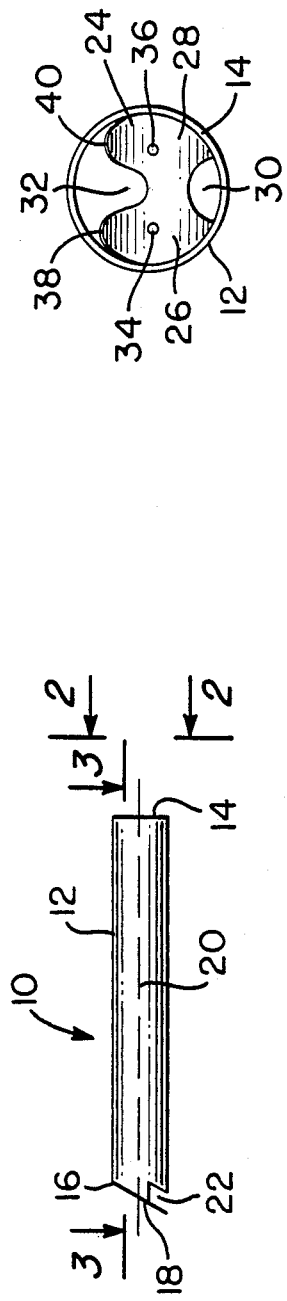
FIG. 1
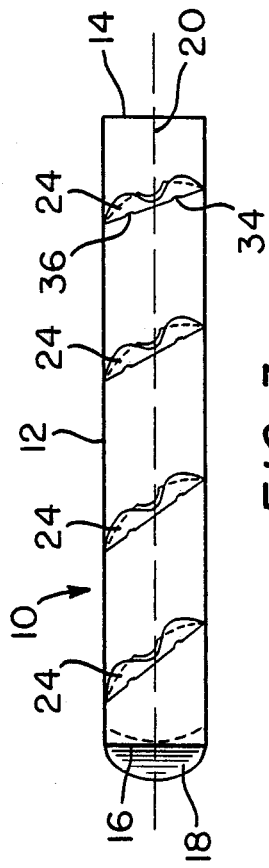
FIG. 2
FIG. 3
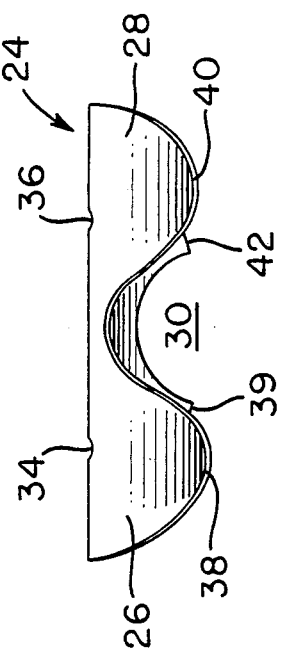
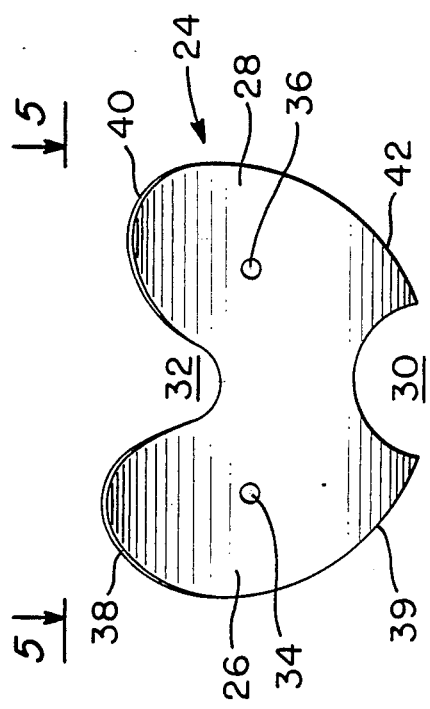
FIG. 4
FIG. 5

SMOKE REDUCTION SYSTEM

BACKGROUND OF THE INVENTION

The present invention is in a pollutant reduction system and more specifically, in a pollution reduction system for nautical craft which utilizes, at least in part, fossil fuel.

Environmental concerns have, in recent years, resulted in legislation affecting chemical and other manufacturing processes as well as fuel consuming vehicles. Nautical craft, which consume fossil fuel for power generation, often generate smoke and pollutant gases during operation.

Technology as applied to nautical craft has always been a specialized area. A prime consideration in nautical craft is the density factor. This requires that any such apparatus or system used in nautical craft occupy a minimum of space without adding significant weight concentrated in that limited space. The continuous exposure to the erosive and corrosive affects of water, especially sea water, requires that any such system or apparatus in service must be able to be constructed of corrosive-resistant materials which still can meet with operational requirements.

While the foregoing requirements are applicable to all nautical craft, they are especially applicable to pleasure craft, workboats and tugboats which generally have comparatively limited available space. Another consideration is that any pollutant control system should require minimum modification to an existing exhaust system with little or no effect on other operational aspects of that exhaust system.

Generally nautical craft use a diesel engine which can produce a densely smokey exhaust including invisible gaseous pollutants.

One approach taken to control vehicle emissions is exemplified in U.S. Pat. No. 3,657,878 to Kaufmann. In this patent, there is disclosed an exhaust system which includes a optimized venturi insert which is coupled mechanically so that with increasing vehicle speed, additional combustion air is introduced in the exhaust to complete combustion. This approach involves the risk of upsetting the balance of exhaust gases versus incoming air and also requires a mechanical linkage which, has no more reliability than any typical mechanical assembly. Also used in the Kaufmann system is the injection of a fluid for reaction. Such an arrangement would not be suitable for use in nautical vessels.

U.S. Pat. No. 3,577,728 to Von Brimer discloses an exhaust gas processing system wherein the exhaust pipe of a vehicle tangentially engages a cylindrical tubular reactor section so that exhaust gas is fed cyclonically into the reactor. The tubular reactor section has an opening such that the suction developed by the centrifugal motion of the exhaust gas products induces additional air. An ignitor or catalytic element is included in the tubular reactor to further advance or complete the combustion of unreacted products. In this arrangement, because of the high centrifugal force which is generated, there is a significant temperature rise within the reactor which, according to the patentee, encourages the combustion reaction. This temperature increase is somewhat diluted by the induction of air due to the cyclonic effect. Further, because of the centrifugal forces generated there is significant opportunity to develop a back pressure and therefore Von Brimer limits the exhaust injection inlet velocity to no more than 80% of sonic velocity.

In another variation of this prior art device the chamber is equipped with a helical baffle member to impart a helical or spiral pattern to the exhaust gases and to insure sufficient residence time within the reactor for a complete combustion. It further aids in absorbing sound energy.

U.S Pat. No. 3,107,484 to Touhey describes an attachment for use in a tail pipe having a number of helical vanes or fins to divert air into the tail pipe to dilute the gases therein. The attachment serves to reduce back pressure at the muffler and engine to increase the efficiency of the engine and to further dilute the exhaust gases with fresh air so that odors, corrosive and toxic qualities of the gas are reduced.

U.S. Pat. No. 4,339,918 to Michikawa discloses an attachment to the end of an automobile exhaust pipe which includes a number of spiral blades to impart a rotary motion to the exhaust gas. The attached tubular member has a first section having a gradually flaring diameter along the direction of exhaust gas flow and a second tubular portion which gradually tapers off in that same direction along with a trumpet-shaped tubular portion, the diameter of which suddenly widens from the smallest diameter portion of the second tubular portion. The spiral blades are disposed in the tubular member between the first and second portion and are of a relatively complicated configuration. The device is especially designed for motor vehicles rather than water craft.

In U.S. Pat. No. 3,016,692 an exhaust arrangement is disclosed wherein a static means surrounds the exhaust outlet to create a suction which accelerates the velocity of the exhaust gases. This purportedly results in better engine efficiency. The device of this patent includes angularly spaced vanes within a tapered nozzle which surrounds the exhaust pipe.

U.S. Pat. No. 3,495,385 to Glass shows an air pollution control device wherein an apertured helical pipe delivers exhaust gas and extends for a portion of its length about the clean gas outlet pipe of the device and a conduit delivering decontaminating liquid from the device to the helical pipe. The apparatus is inserted in the conventional exhaust pipe of an automobile. The exhaust gas experiences a venturi effect because of the conduit opening, which creates a strong vacuum and causes the entraining of liquid particles in the gases wherein they intermix with the pollutants and are transferred into the liquid phase.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIG. 1 is a side elevation view of the apparatus of the invention;

FIG. 2 is a view along view line 2—2 of FIG. 1;

FIG. 3 is a cutaway plan view along view line 3—3 of FIG. 1;

FIG. 4 shows a front view of a baffle used in the invention; and

FIG. 5 shows a view of the baffle along view line 5—5 of FIG. 4.

DESCRIPTION OF PREFERRED EMBODIMENT

FIG. 1 shows a side elevation view of the apparatus 10 of the invention. Apparatus 10 is formed of a elongate section 12, which is preferably of tubular configuration, and has gas intake end 14 and an exhaust end 16. Intake end 14, and tubular section 12 are so dimensioned so as to fit within the exhaust pipe (not shown) of a boat. Exhaust gas enters apparatus 10 at gas intake end 14 and is exhausted at exhaust end 16. The exhaust gas experiences a cyclonic action in apparatus 10 which is accelerated along the length of the section 12 as the exhaust gas moves from intake end 14 to exhaust end 16.

Exhaust end 16 is formed with a splash plate 18 which is oriented at an angle with respect to the perpendicular to the longitudinal axis 20 (shown in dash) of apparatus 10. The splash plate 18 and tubular section 12 form an opening 22 at the lower section of the exhaust end 16 through which the gas is exhausted. Generally, tubular section 12 will be so dimensioned so as to engage the inner wall of the craft's exhaust pipe. A sealant, such as a silicone or a caulking compound, can be employed to affix the apparatus 10 within the craft exhaust section. Apparatus 10 is preferably constructed of steel or brass or a corrosive-resistant aluminum, or a ceramic material. However, other materials with corrosion-resistant characteristics which can withstand the operational requirements can be used. A preferred material of construction is stainless steel.

FIG. 2 is an end view along line 2—2 of FIG. 1. Permanently affixed within tubular section 12 is a double ear baffle. Baffle 24 can be formed of two sections or be formed of a single section. In either case baffle 24 has ears 26 and 28. The baffle 24 occupies approximately 60% of the cross sectional area of tubular section 12. The baffle 24 is configured so that a plurality of arcuate open spaces 30 and 32 are formed. Each of the arcuate ears 26 and 28 is formed with an aperture 34 and 36 respectively.

FIG. 3 shows a cutaway along view line 3—3 of FIG. 1 of the apparatus 10. The tubular section 12 houses a plurality of baffles such as baffle 24. As depicted in FIG. 3 the baffles 24 are each oriented at a different angle with respect to, and along the longitudinal axis of tubular section 12. The offset from a perpendicular to the longitudinal axis 20 occurs in increments of approximately 5° along the length of the section 12 moving from the intake end 14 to exhaust end 16. Baffles 24 are otherwise equally spaced apart along the longitudinal axis 20. The respective openings 34 and 36 can also increase in size from baffle to baffle along the longitudinal axis. For instance, apertures 34 and 36 on the baffle 24 nearest the intake end 14 can be for instance ⅛ in. in diameter whereas such openings in the baffle 24 closest to exhaust end 16 can be, for instance, ¼ inches. Accordingly, due to the increase in length of the respective baffles 24 from the intake end 14 to the exhaust end 16, the length of one ear increases from baffle to baffle.

As shown in FIGS. 3 to 5, each baffle 24 is slightly folded (curved) about its horizontal axis. Because of the angular offset, the upper arcuate section 38 protrudes above the arcuate section 40 by about approximately ¼ of an inch. This offset further aids in accelerating the exhaust gas both tangentially and in the longitudinal direction of the tubular section 12 from intake end 14 to the exhaust end 16.

As shown in FIG. 4, in a preferred embodiment the baffle is formed of a number of varying arcuate sections. So, for example, each ear 26 and 28 is formed of two arcuate sections; ear 26 from sections 38 and 39 and ear 28 from 40 and 42. Generally the corresponding radius of arcuate section 39 is greater than that of 38 and, likewise, that of 42 is greater than that of 40.

In operation, fuel powered water craft generally rely on the available water to circulate through the system to cool the engine. Water thus passes through the exhaust pipes. When the circulating water of the engine cooling system flows through the ship's exhaust pipes, it also will pass through apparatus 10. The water flows through the open sections of the apparatus such as open space 30. The flow of water may be either continuous or pulsating. As the exhaust gas enters apparatus 10, it acquires a cyclonic action whipping through the water layer. As the gas velocity increases, the water is shattered into droplets as in a venturi gas-liquid contact section. The generation of water droplets provides a large contact surface so that the fine soot smoke or fume particulate is washed from the gas phase along with gaseous contaminants. Due to the baffle configuration and the combination of openings 30, 34 and 36, a double or accentuated split venturi effect is realized thus providing an improved cleaning effect on the pollutant laden exhaust gas.

The water and water droplets travel tangentially and longitudinally through the apparatus 10 toward the exhaust 16. The water is disentrained from the gas phase and passes out through opening 22. The captured contaminants contained in the water are removed by the water passing through the apparatus 10. Splash plate 18 stops water from passing into the apparatus in the wrong direction. Since the exhaust gas still has a tangential flow, it also passes out of apparatus 10 through opening 22 and further inhibits the intake of water through the opening.

The exhaust end 16 may be equipped with a filter to further remove smoke particles from the gas as well as the water within the apparatus 10.

If a liquid heavier than water or salt water is utilized, the angular offset of the baffles can vary from a minimum of 20° to 35°-40°, again in 5° increments.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

What is claimed is:

1. A pollution control apparatus for a nautical craft comprising:
    an elongate section having an intake end and an exhaust end, said elongate section having a longitudinal axis; and
    a plurality of double-ear baffles housed within said elongate section and angularly offset from a perpendicular to said longitudinal axis wherein the angular offset of the baffles increases from the intake end to the exhaust end.

2. The apparatus of claim 1, wherein each of the plurality of baffles is formed with at least one aperture therein.

3. The apparatus of claim 1, wherein the angular offset of each of the plurality of baffles changes from one baffle to the next.

4. The apparatus of claim 1, wherein one respective ear of the respective double ear baffles extends above the other respective ear.

5. The apparatus of claim 1, further comprising a splash shield at the exhaust end.

6. The apparatus of claim 5, wherein the splash shield forms an opening with the exhaust end of said elongate section.

7. The apparatus of claim 1, wherein each of the plurality of baffles- has an area that occupies approximately 60% of the cross sectional area of the elongate section.

8. The apparatus of claim 1, wherein the elongate section is adapted for an engaging fit into an exhaust of the nautical craft.

9. The apparatus of claim 1, wherein the elongate section has an inner wall and each of the plurality of baffles is of a configuration so as to form a plurality of arcuate openings with the inner wall of the elongate section.

10. The apparatus of claim 3, wherein the elongate section has an inner wall and each of the plurality of baffles is of a configuration so as to form a plurality of arcuate openings with the inner wall of the elongate section.

11. The apparatus of claim 10, wherein the minimum angular offset is 30°.

12. The apparatus of claim 11, wherein the maximum angular offset is 45°.

13. The apparatus of claim 3, wherein the incremental change of angular offset between successive baffles of the plurality of baffles is 5°.

14. The apparatus of claim 1 constructed of stainless steel.

15. A gas acceleration apparatus comprising:
   an elongate section having an intake end and an exhaust end, said elongate section having a longitudinal axis; and
   a plurality of doubled-ear baffles housed within said elongate section and angularly offset from a perpendicular to said longitudinal axis wherein the angular offset of the baffles increases from the intake end to the exhaust end.

16. The apparatus of claim 15, wherein the angular offset of each of the plurality of baffles changes from one baffle to the next.

17. The apparatus of claim 15, wherein one respective ear of the respective double ear baffles extends above the other respective ear.

18. The apparatus of claim 15, wherein the elongate section has an inner wall and each of the plurality of baffles is of a configuration so as to form a plurality of arcuate openings with the inner wall of the elongate section.

* * * * *